United States Patent [19]

Kawase et al.

[11] Patent Number: 4,568,059
[45] Date of Patent: Feb. 4, 1986

[54] BALL VALVE

[76] Inventors: Takeshi Kawase, 17-14, Motohamacho; Masayasu Kawase, 17, Sanwacho, both of Nagahama-shi, Shiga-ken, Japan

[21] Appl. No.: 708,376

[22] Filed: Mar. 7, 1985

Related U.S. Application Data

[63] Continuation of Ser. No. 487,832, Apr. 22, 1983, abandoned.

[30] Foreign Application Priority Data

Apr. 26, 1982 [JP] Japan .............. 57-61618[U]

[51] Int. Cl.⁴ .................. F16K 35/00; F16K 5/06
[52] U.S. Cl. ...................... 251/99; 251/315; 411/518
[58] Field of Search ............ 251/315, 297, 98, 99; 411/353, 517, 518

[56] References Cited

U.S. PATENT DOCUMENTS

| | | | |
|---|---|---|---|
| 2,741,138 | 4/1956 | Russell | 251/99 X |
| 2,912,218 | 11/1959 | Stillwagon | 251/306 |
| 3,195,560 | 7/1965 | Pofit | 251/315 |
| 3,239,191 | 3/1966 | Widera | 251/315 |
| 3,246,873 | 4/1966 | Johnson | 251/315 |
| 3,299,904 | 1/1967 | Burke | 251/297 |
| 3,348,805 | 10/1967 | Sanctuary | 251/315 |
| 3,522,930 | 8/1970 | Richards et al. | 251/315 |
| 3,561,730 | 2/1971 | Hurst | |
| 3,567,176 | 3/1971 | Johnson | 251/315 |
| 3,669,406 | 6/1972 | Moore | 251/315 |
| 3,679,170 | 7/1972 | Bernas et al. | 251/297 |
| 3,827,671 | 8/1974 | Bolden et al. | 251/297 |
| 3,858,843 | 1/1975 | Hartmann | 251/99 |
| 3,921,955 | 11/1975 | Haddad, Jr. | 251/297 |
| 4,183,280 | 1/1980 | Hashimoto | 411/518 |
| 4,256,010 | 3/1981 | Petrie | 411/518 |
| 4,397,445 | 8/1983 | Burquier | 251/99 X |

FOREIGN PATENT DOCUMENTS

| | | | |
|---|---|---|---|
| 406660 | 3/1934 | United Kingdom | 251/315 |
| 1022012 | 3/1966 | United Kingdom | 251/315 |

Primary Examiner—A. Michael Chambers
Assistant Examiner—John C. Fox
Attorney, Agent, or Firm—Wenderoth, Lind & Ponack

[57] ABSTRACT

A ball valve for medium and low pressure service includes a valve body, a valve member positioned in the valve body, circlips attached to the valve body, and provided at the upstream side and downstream side of the valve member, and sealing members provided between respective of the circlips and the valve member. The circlips are urged toward the valve member via the sealing members and are kept in a floating state. The valve member is of spherical shape, having a first and a second fluid passage holes and a valve stem groove and does not include a seam.

1 Claim, 15 Drawing Figures

BALL VALVE

This application is a continuation, of now abandoned application Ser. No. 487,832, filed Apr. 22, 1983, now abandoned.

BACKGROUND OF THE INVENTION

1. Field of the Invention

The present invention relates to improvements of ball valves for medium and low pressure service.

2. Description of the Prior Art

Figure 1:
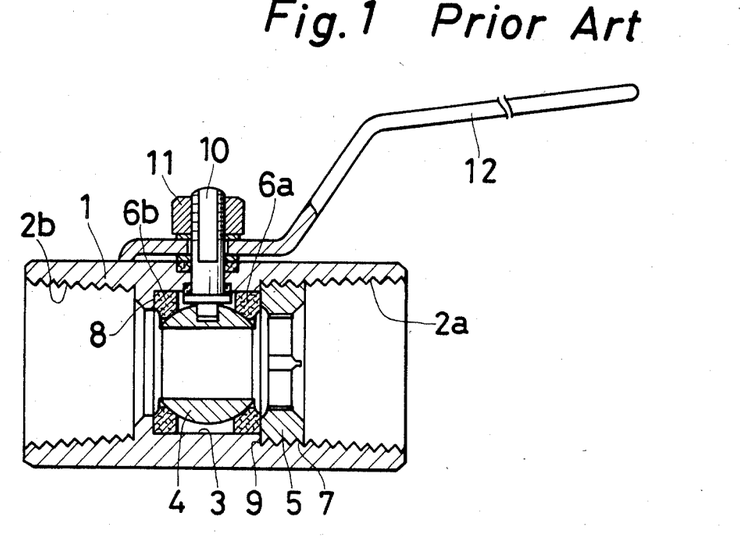
FIG. 1 is a sectional view of a prior art arrangement.
Figure 2:
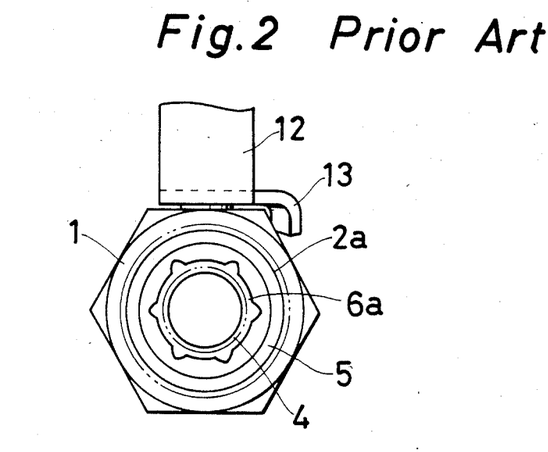
FIG. 2 is a right side elevation thereof.

FIG. 1 is a sectional view of a conventional ball valve, and FIG. 2 is a right side elevation thereof. A valve body 1 is made of a hexagonal tubular body, and internal threads 2a, 2b are cut for connection with joints. A cylindrical passage 3 is machined in the valve body 1, and a spherical valve member 4 held by a pair of sealing members 6a, 6b is placed in this passage. One sealing member 6a is prohibited from displacement in the axial direction by a threaded ring 5 screwed into an internal thread 7 which is continuous to the internal thread 2a. The other sealing member 6b is prohibited from displacement in the axial direction by abutting against a stepped part 8 formed in the valve body 1. The threaded ring 5 abuts against a stepped part 9 formed in the valve body 1.

In such prior art arrangement, if the length in the axial direction, that is, the thickness, of sealing members 6a, 6b is small, and when the outside diameter of valve member 4 is small, a gap is produced between the outer circumference of the valve member 4 and the sealing members 6a, 6b, which gap spoils the enclosing function of the valve construction. To the contrary, when the thickness of sealing members 6a, 6b is great, and when the outside diameter of the valve member 4 is large, it is impossible to tighten the threaded ring 5 until it abuts against the stepped part 9, and if it is attempted to force such tightening, the sealing members 6a, 6b and valve member 4 are brought into tight contact, thereby making it difficult to rotate the valve member 4. In this case, if the threaded ring 5 is tightened in a state permitting easy rotation of the valve member 4, the threaded ring 5 may be easily loosened by vibration or temperature changes. Therefore, the threaded ring 5 must be tightened firmly until it abuts against the stepped part 9. Hence, in order to achieve the desired degree of tightness by accommodating the sealing members 6a, 6b and valve member 4 into a fixed space determined by the valve body 1 and threaded ring 5, high dimensional precision of the sealing members 6a, 6b, and valve member 4 is required. As a result, productivity is lowered, and cost is increased.

This prior art arrangement is applicable for high pressure fluid. However, conventionally, such prior art arrangement has been applied for medium to low pressure fluids, such as town gas and water. When such prior art arrangement is used for medium to low pressure fluids, such use is a waste of materials.

An end of a drive shaft 10 is fitted to the valve member 4, and a handle 12 is fitted to the other end of the drive shaft 10 by way of nut 11. At the bottom of the handle 12, a stopper 13 is bent toward the side of valve body 1. When the stopper 13 abuts against the outer wall of the valve body 1, the valve member 4 may be set in the fully closed or open state. In such prior art arrangement, the valve member 4 may be displaced angularly and the valve opening degree may vary when the handle 12 receives an external force or when vibration occurs.

In summary, in the prior art arrangement, improvement of dimensional precision has been required, and there has been a possibility of the valve changing to an undesired operating condition.

Accordingly, it is one of the objectives of the present invention to solve these technical problems and provide ball valves for medium to low pressure service with improved productivity, and which are reduced in weight by use of smaller amounts of materials, high in rigidity, and excellent in wear resistance.

In another prior art arrangement in which valve parts are welded, rust often occurs due to degeneration of material due to local high temperatures caused by welding.

It is another objective of the present invention to provide ball valves for medium to low pressure service, without requiring welding, and which hence are free of rust attributable to welding, so as to be used safely for long periods of time.

SUMMARY OF THE INVENTION

To accomplish the foregoing objectives, there is provided a ball valve for medium to low pressure service including a valve body, a valve member positioned in the valve body, circlips attached to the valve body and provided at the upstream side and downstream side of the valve member, and sealing members provided between respective of the circlips and the valve member. The circlips are urged toward the valve member via the sealing members and are kept in a floating state.

According to the present invention, since the sealing members are pressed against the valve member by using the circlips fixed to the valve body so that the valve member may be kept in a floating state, dimensional tolerances of the sealing members and valve member are absorbed, and a desired degree of tightness may be obtained. Also machining is easier in this invention as compared with the prior art, and material savings is great. At the same time, productivity is improved.

According to the preferred embodiment of the invention, a belleville spring is provided between at least one the sealing member and circlip.

Owing to the belleville spring, air tightness between the valve member and sealing members may be improved.

Furthermore, in this invention, since there is no seam on the spherical surface of the valve member, seam-originated difficulties, such as leakage, breakage, disturbances of flow in route, and sticking of deposits, may be prevented. What is more, the product according to the present invention is completely free of rust, which is one of the defects of welded products.

According to the preferred embodiment of the invention, a cylindrical body having stepped surfaces at both opposite ends thereof is inserted into and attached to the valve member. The stepped surfaces abut against the inner surface of fluid passage holes of the valve member due to radially outward resiliency of the cylindrical body in the radial direction.

In this embodiment, the ball valve may be used with fluids of relatively high viscosity or high flow velocity.

DESCRIPTION OF THE PREFERRED EMBODIMENTS

Figure 3:
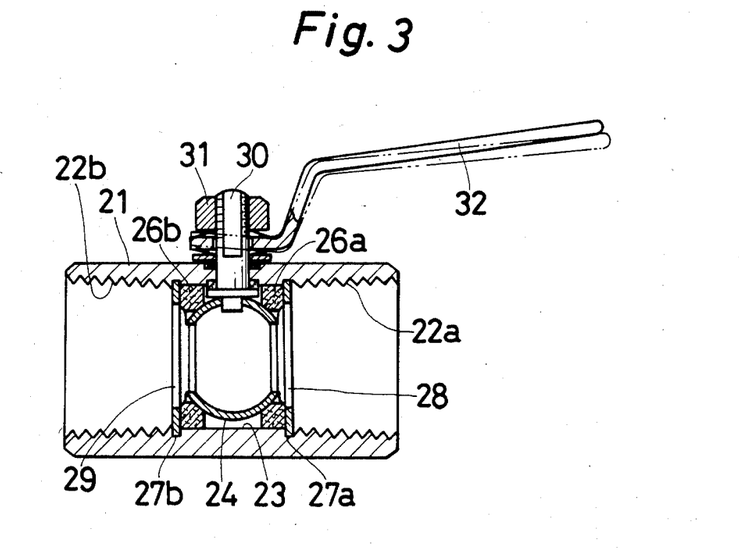
FIG. 3 is a sectional view of one embodiment of the invention.
Figure 4:
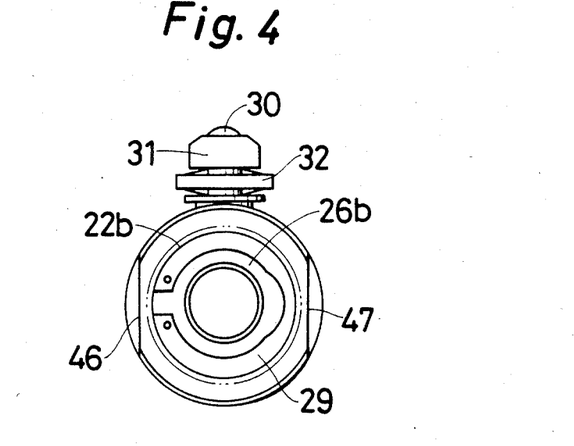
FIG. 4 is a left side elevation thereof.

Referring now to the drawings, embodiments of the present invention are described below. FIG. 3 is a sectional view of one of the embodiments, and FIG. 4 is a left side elevation of the ball valve shown in FIG. 3. A valve body 21 having a circular exterior is manufactured by cutting a tubular body of straight cylindrical form. In a cylindrical passage 23 provided in the valve body 21 are assembled a valve member 24 and sealing members 26a, 26b provided at opposite sides of member 24. Internal threads 22a, 22b are machined at both ends in the axial direction of the valve body 21. Fitting grooves 27a, 27b are formed at opposite axial ends of the cylindrical passage 23. Circlips 28, 29 are resiliently fitted in these fitting grooves 27a, 27b, respectively.

Figure 5:
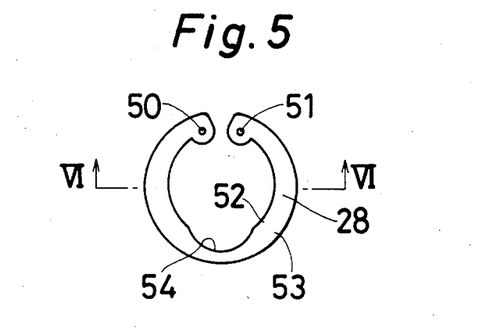
FIG. 5 is a front view of a circlip used in the present invention.
Figure 6:
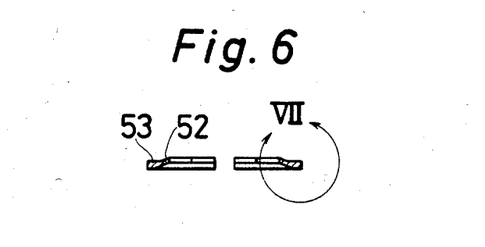
FIG. 6 is a section along line VI—VI of FIG. 5.
Figure 7:
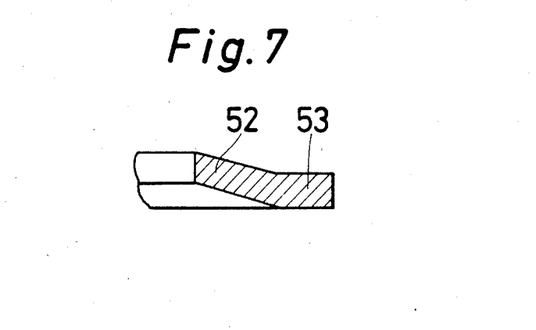
FIG. 7 is an enlarged sectional view of area VII of FIG. 6.

FIG. 5 is a front view of the circlip 28, FIG. 6 is a section along line VI—VI of the circlip in FIG. 5, and FIG. 7 is an enlarged sectional view of area VII in FIG. 6. The circlip 28 is manufactured of an approximately circular steel plate notched in the circumferential direction. At both ends of the circlip 28 are formed engaging holes 50, 51 for convenience of mounting the circlip.

In this embodiment, an inner part or circumferential portion 52 of the circlip 28 is displaced axially in the thicknesswise direction (in the vertical direction of FIGS. 6 and 7, or in the direction vertical to the plane of in FIG. 5) with respect to outer part or circumferential portion 53. In the illustrated embodiment the inner part 52 is plastically deformed in a direction upward in FIGS. 6 and 7. A notch 54 is formed in the inner portion 52 at a position displaced 180 degrees from the ends of the circlip. At this notch 54, the inner part portion 52 is removed. By the axial or thicknesswise displacement of the inner part 52 with respect to the outer part 53, a spring force is exhibited in the axial or thicknesswise direction of the circlip 28. By the formation of the notch 54, the outside diameter of the circlip 28 may be easily reduced by bringing the engaging holes 50, 51 closer to each other by means of a tool or jig engaged therein. Also by means of a tool or jig, the outside diameter of the circlip 28 may be easily expanded resiliently by applying external forces to the engaging holes 50, 51 in directions away from each other.

When the circlip 28, with its outside diameter reduced, is fitted into the fitting groove 27a, and then released, it is retained therein firmly by an outward resilient force in the radial direction. The inner part 52 of the circlip 28 is resiliently projected toward the sealing member 26a, and the sealing member 26a is pressed against the outer circumference of the valve member 24. The other circlip 29 is similarly constituted, and its inner part is resiliently projected toward the sealing member 26b, and the sealing member 26b is pressed against the outer circumference of the valve member 24. Thus, the tolerances between the valve member 24 and the sealing members 26a, 26b are absorbed, and a desired degree of tightness may be obtained. The forces acting on the sealing members 26a, 26b by means of the circlips 28 and 29 are smaller than the natural strength of the sealing members 26a, 26b, so that the sealing members 26a, 26b will not be forced into excessively tight contact with the outer circumferential surface of the valve member 24, and such forces also are smaller than the pressure of the pressure fluid with which the value is used.

One end of a drive shaft 30 is fitted to the head of the valve member 24. A handle 32 is fitted to the other end of this drive shaft 30 by way of nut 31.

Figure 8:
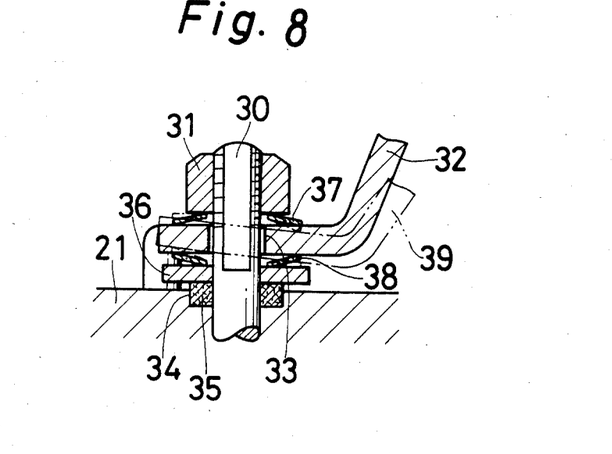
FIG. 8 is a sectional view in the area of the base of a handle.

FIG. 8 is an enlarged sectional view in the vicinity of the drive shaft 30. The section of shaft 30 extending at a right angle to the axis of the drive shaft 30 is polygonally formed, and the handle 32 has formed therein an engaging hole 33 into which is inserted drive shaft 30. Thus, turning torque is transmitted from the handle 32 to the shaft 30. A ring-shaped seal piece 35 is fitted in a concave recess 34 of the valve body 21, and a washer 36 fits over this seal piece 35. A belleville spring 37 is present between a nut 31 and handle 32, and another belleville spring 38 is present between the handle 32 and washer 36. The outer parts of the belleville springs 37, 38 project to the sides of handle 32. Thus, the handle 32 may be inclined to the position 39 indicated by phantom lines.

Figure 9:
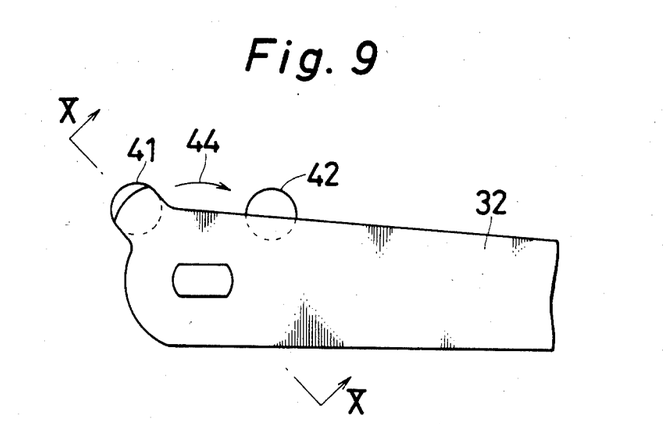
FIG. 9 is a plan of the base area of the handle.
Figure 10:
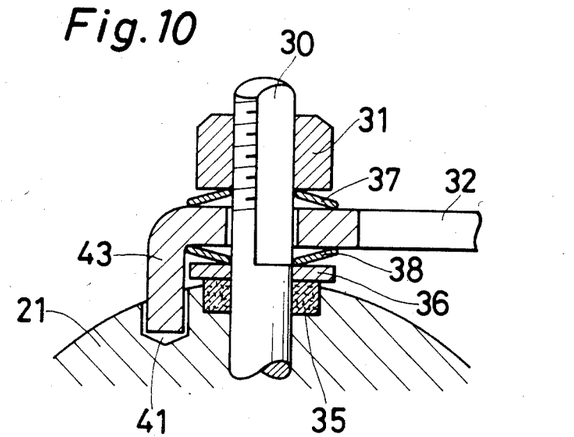
FIG. 10 is a section along line X—X FIG. 9.

FIG. 9 is a plan of the base area of the handle 32. FIG. 10 is a section along line X—X of FIG. 9. Concave recesses 41, 42 are formed in the valve body 21, and a stopper 43 which may be selectively fitted into concave recesses 41 or 42 is formed on the handle 32, to project outwardly therefrom. When the stopper 43 is seated in the concave recess 41, the valve member 24 is in the position shown in FIG. 3, and the valve is open. When the stopper 43 is removed from the concave recess 41 by displacing the handle 32 against the spring force of belleville springs 37, 38 to position 39, the ball valve may be closed by turning the handle 32 in the direction of arrow 44. When the handle 32 is released, the stopper 43 is fitted into the concave recess 42. Thus, the fully closed position of the ball valve is established. When the stopper 43 is inserted in the concave recesses 41 or 42, the handle 32 will not be rotated if an undesired external force is applied to it, so that the fully closed position or fully open position of the valve is maintained.

Planar surfaces 46, 47 (see FIG. 4) are formed on the outer wall of the valve body 21, whereby a spanner or the like is applied during threading to internal threads 22a, 22b of threaded pipe ends. The valve body 21 is formed by machining a straight cylindrical tube, and this machining is easier than formation of the prior art exterior shown in FIG. 2. Not only is there a saving of materials, but also productivity may be increased by this machining process.

The circlip thus formed by displacing axially the inner circumferential portion relative to the outer circumferential portion may be applied not only to ball valves, but also to other technical fields.

Figure 11:
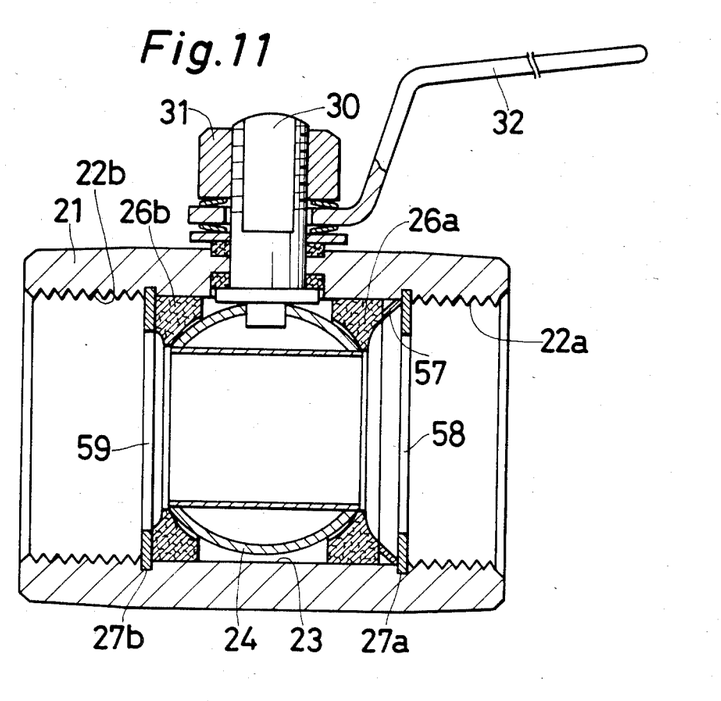
FIG. 11 is a sectional view of another embodiment of the invention.

FIG. 11 is a sectional view of a ball valve according to another embodiment of the present invention. In this embodiment, the parts similar and corresponding to those used in the previous embodiment are denoted by the same reference numerals. What is of particular note is circlips 58, 59, which are, unlike the previous circlips 28, 29, conventional and are not deformed in the thicknesswise direction. Therefore, the force to press the sealing member 26a against the outer circumference of the valve member 24 is achieved by a belleville spring 57 positioned between the sealing member 26a and circlip 58. Thus, tolerances of the valve member 24 and sealing members 26a, 26b are absorbed, and a desired degree of tightness may be achieved.

In the aforesaid embodiment, the belleville spring 57 was provided only on one side in the axial direction of the valve body 21, that is, between the sealing member 26a and circlip 58. However, belleville springs may be provided on both sides in the axial direction of the valve body 21, that is, between sealing members 26a, 26b, and circlips 58, 59.

In a ball valve of such construction for medium to low pressure service, it is preferable that the sealing members 26a, 26b be in line contact with the valve member 24 a radially inner part thereof, so that the air tightness between the valve disc 24 and sealing members 26a, 26b may be improved.

The ball valve conforming to the present invention may be used only with medium to low pressure fluid of such a degree that the circlip will not be broken by shearing stresses acting on the circlip. However, by increasing the thickness of the circlip, it also may be used with high pressure fluid.

Figure 12:
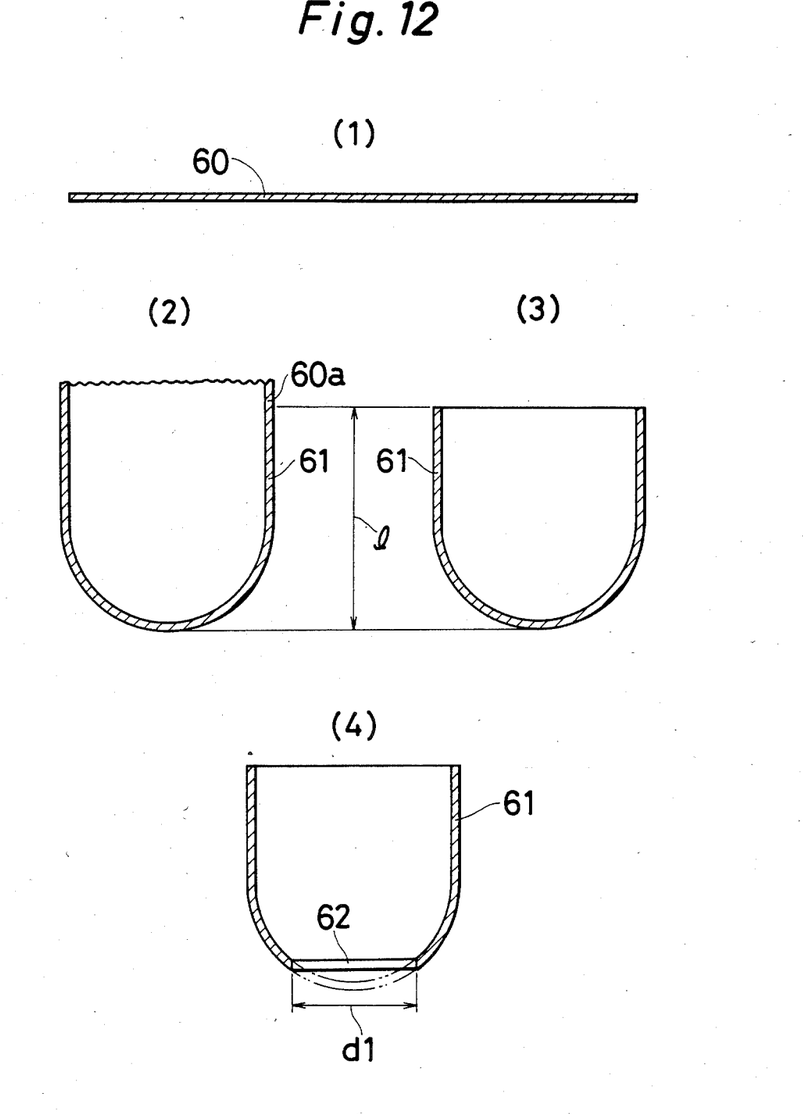
FIG. 12 shows sectional views of the production process of a valve member of the present invention.

Referring next to FIG. 12, the manufacturing process of the valve member 24 is described below. First a thin disc-shaped steel plate 60 having a desired thickness, as shown in FIG. 12 (1), is pressed or drawn to a bell-shaped semifinished product 61 as shown in FIG. 12 (2). The opening end 60a made by the drawing process is cut off to the form shown in FIG. 12 (3). Then, as shown in FIG. 12 (4), the curved part of the semifinished product 61 is partly blanked to form a fluid passage hole 62 having diameter d1. Next, as shown in FIG. 12 (5), the free ends of the semifinished product 61 are encased in upper and lower cup-shaped molds 64, 65, and the entire body is formed spherically. At this time, a fluid passage hole 63 is formed oppositely to the fluid passage hole 62. The length l of the semifinished product 61 in the axial direction, the vertical direction in FIG. 12 (2), is determined so that the diameter d2 of the fluid passage hole 63 will be equal to the diameter d1 of the fluid passage hole 62 as shown in FIG. 12 (4). Finally, by machining the fluid passage holes 62, 63 and valve stem groove 66 and polishing the spherical surface 67, a seamless valve member 24 is completed as shown in FIG. 12 (6).

In other method, a thin-wall pipe material may be cut to a length of one valve construction, and the valve disc may be manufactured by plastically processing with upper and lower cup-shaped molds. In this embodiment, there is no seam, and although the thickness is small, the strength is high because of the principle of the internal force of hooping. What is more, since rolling material is used, the molecular density of material is high, so that a wear-resistant valve member free of pinholes or cracks may be obtained.

Figure 13:
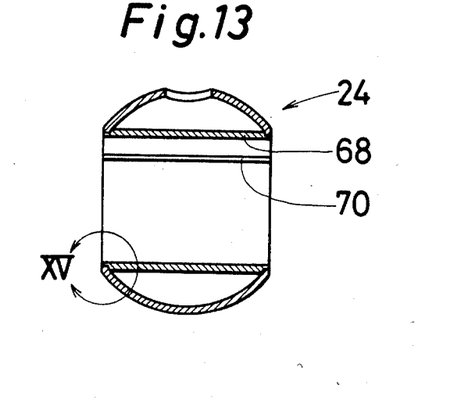
FIG. 13 is a sectional view of a valve member of another embodiment of the invention.
Figure 14:
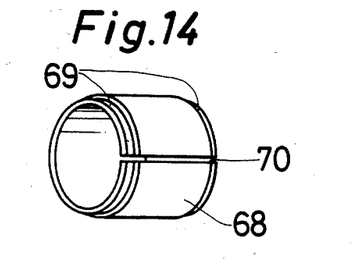
FIG. 14 is an oblique view of a cylindrical body.
Figure 15:
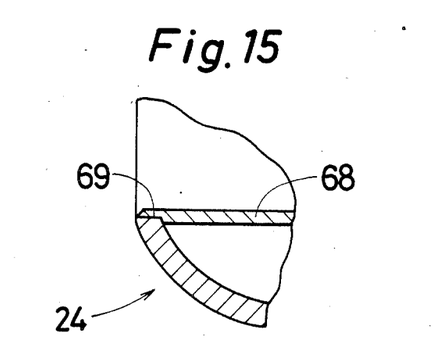
FIG. 15 is an enlarged sectional view of section XV in FIG. 13.

FIG. 13 is a sectional view of another embodiment of valve member 24 conforming to the present invention, FIG. 14 is an oblique view of a cylindrical body, and FIG. 15 is an enlarged sectional view showing area XV in FIG. 13. In this embodiment, a cylindrical body 68 is placed on the valve member 24. The cylindrical body 68 is curved structure of a single thin steel sheet, and stepped surfaces 69 are formed on the periphery of each opposite end thereof. The stepped surfaces 69 abut against the inner surface of the fluid passage holes 62, 63 in the valve member 24 due to radially outward resiliency of body 68, thereby preventing the cylindrical body 68 from slipping off the valve member 24 in axial directions. When the cylindrical body 68 is placed on the valve member 24, the end-to-end clearance 70 of the cylindrical body 68 should be as small as possible, for example 0.1 to 0.3 mm. In this embodiment, the ball valve may be applied to fluids of relatively high viscosity or high flow velocity.

What is claimed is:

1. A ball valve for medium and low pressure service, said ball valve comprising:

a valve body having therethrough a cylindrical passage having internally threaded portions at opposite axial ends thereof;

a spherical valve member positioned within said cylindrical passage;

sealing members positioned on opposite sides of said valve member for sealing therewith and with said valve body;

means for urging said seal members into sealing contact with said valve body while maintaining said seal members in a floating state, said urging means comprising circlips fitting into respective grooves in said valve body at positions on sides of respective said seal members opposite said valve member, each said circlip including a circumferential outer portion fitting into a respective said groove and a circumferential inner portion offset axially from said outer portion and bearing on the respective said seal member, each said circlip having circumferentially spaced ends having formed therein engaging holes, and each said circlip having formed in said inner portion thereof a notch at a position spaced circumferentially 180° from said ends;

a shaft fixed to said valve member and extending through said valve body, said shaft having a portion of non-circular configuration;

a handle fixed to said shaft to enable rotation of said shaft and said valve member between valve open and valve closed positions, said handle having therethrough an opening of non-circular configuration complementary to said portion of said shaft, said portion extending through said opening, and said handle having extending therefrom a projection;

a ring-shaped seal fitted within a recess in said valve body and sealingly surrounding said shaft;

first and second recesses formed in said valve body for selective alternative receipt of said projection, said recesses being located at positions such that when said projection fits into said first recess said valve body is in said valve open position and when said projection fits into said second recess said valve body is in said valve closed position;

said handle being mounted on said shaft by means of belleville springs enabling said handle to be inclined relative to said shaft to thereby selectively remove said projection from a said recess and thereby allow rotation of said handle, said shaft and said valve member;
a washer fitted on said shaft between said valve body and said handle and a nut fitted on said shaft outwardly of said handle; and
a first said belleville spring being fitted on said shaft between said washer and said handle, and a second said belleville spring being fitted on said shaft between said nut and said handle, outer peripheral portions of said belleville springs converging toward each other and abutting said handle.

* * * * *